United States Patent [19]

Textoris et al.

[11] 4,239,932
[45] Dec. 16, 1980

[54] PARTITION WIRING SYSTEM

[75] Inventors: Melvin A. Textoris, Struthers; Richard Rauschenberg, North Jackson, both of Ohio

[73] Assignee: GF Business Equipment, Inc., Youngstown, Ohio

[21] Appl. No.: 4,452

[22] Filed: Jan. 18, 1979

[51] Int. Cl.³ .............................................. H02G 3/00
[52] U.S. Cl. .................................... 174/48; 160/127; 339/20; 339/22 R
[58] Field of Search ...................... 174/48, 49; 339/20, 339/23, 22 R; 160/135, 127; 52/221, 173, 238, 239, 241, 242

[56] References Cited

U.S. PATENT DOCUMENTS

| | | | |
|---|---|---|---|
| 3,194,361 | 7/1965 | Thurman | 52/221 X |
| 3,856,981 | 12/1974 | Boundy | 174/48 |
| 3,990,204 | 11/1976 | Haworth | 52/239 |
| 4,020,604 | 5/1977 | Legler | 52/221 X |
| 4,060,294 | 11/1977 | Haworth | 339/22 R X |
| 4,133,153 | 1/1979 | Hage | 52/220 |

Primary Examiner—B. A. Reynolds
Assistant Examiner—D. A. Tone
Attorney, Agent, or Firm—Emory L. Groff, Jr.

[57] ABSTRACT

A partition wiring system includes panels supported by either square or round posts and having electrical raceways beneath the panels with each containing a harness assembly provided with male and female connectors at opposite ends. Series of harness assemblies are joined to one another by mating male and female contacts to deliver current to electrical outlets contained in any one or all of the posts or alternatively, any one or all of the electrical raceways. Variably positionable contact elements on the male and female connectors allow the union of adjacent connectors whether the respective panels are disposed in a straight line or at right angles to one another in a system employing square posts and in a system utilizing round posts, additionally, all intermediate angles. The open bottom of each electrical raceway may be enclosed by either a slidable cover or a disparate telephone wiring raceway.

16 Claims, 4 Drawing Figures

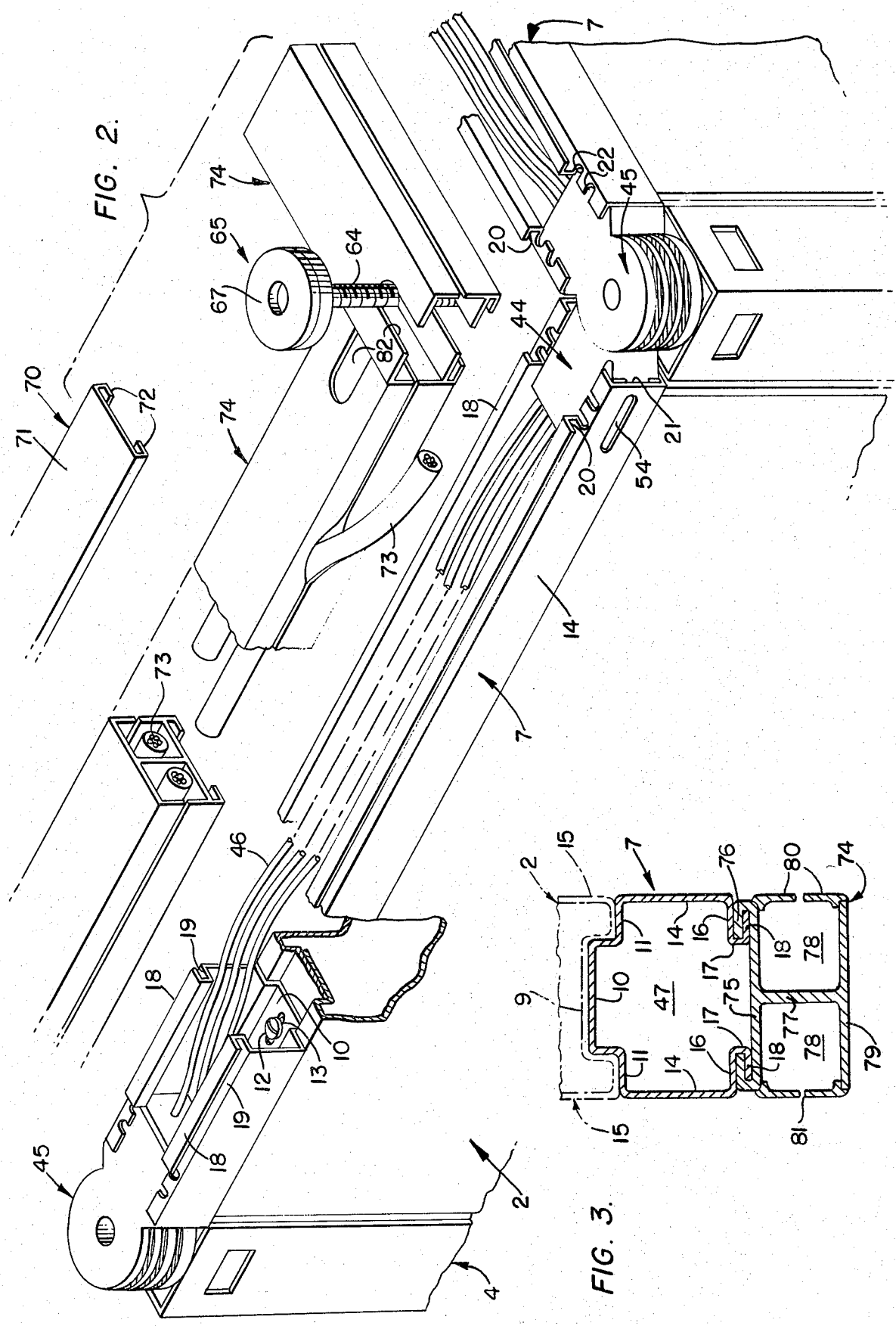

PARTITION WIRING SYSTEM

This invention relates generally to office partitions including a plurality of panels supported between edge-attached posts, and more particularly, to the provision of an improved wiring system including a plurality of harness assemblies carried by raceways along the bottom of the panels for distributing wires serving electrical outlets provided in either selected ones of the supporting posts and/or raceways.

Numerous prior attempts have been made to provide convenient means associated with movable or semi-permanently installed partition assemblies to provide for electrical raceways or wiring channels allowing of the distribution of circuits supplying outlets located at various points in the partition assembly. In many such instances, extensive modification is required of the partition panels and posts and often such modification permanently restricts any further alternate utilization of the panels or posts. Such limitation may restrict rearrangement of the partition system should the user desire to alter the location of the outlets.

In the present invention an improved arrangement is provided comprising a single electrical raceway readily attached to the bottom of each of the panels and having at each of its ends means for removably securing thereat two mating components of a harness assembly, which components cooperate respectively with similar mating components of adjacent harness assemblies carried by the respective adjacent panels and posts. The components are constructed to provide male and female connectors allowing of selective attachment therebetween at any point within at least an arc of 180° therebetween thereby permitting attachment of two adjacent such harness assemblies when the respective panels are disposed in either a straight line or alternatively, at a left or right hand right-angular disposition. By utilizing round posts to support the panels, intermediate angular arrangements may be selected without any modification or adjustment of the wiring system. Certain of the components are intended to underlie the bottom of the supporting post and cooperate with other mating components substantially fully disposed within the confines of the adjacent electrical raceways. Those components associated with the bottom of the supporting posts further include a central vertical bore receiving the screw shaft of an appropriate glide having a foot adapted to engage the floor or other surface to support the entire partition assembly.

The instant electrical raceways are adapted to be readily attached to the bottom of many existing panels with no more than a simple tool such as a screwdriver and each raceway includes sides walls disposed substantially co-planar with the panel outer surfaces while the bottom edges of the raceways are provided with spaced apart grooves defining an opening therebetween for the ready insertion of the various harness assemblies. The referenced grooves provide convenient means for the subsequent attachment of a raceway cover or alternatively, for the mounting of a separate telephone raceway therebeneath. The telephone raceways are preferably longer than the electrical raceways so that one end extends beneath one of the harness assembly connectors located beneath one of the supporting posts, while the other end thereof is vertically aligned with the opposite end of the overlying electrical raceway. The ends of the telephone raceways are slotted to provide clearance for the glides carried by the structure associated with the respective supporting posts.

Accordingly, one of the objects of the present invention is to provide an improved partition wiring system including individual electrical raceways attached to the bottom of each of a plurality of partition panels with separate harness assemblies carried by each raceway and including mating connectors at opposite ends thereof.

A further object of the present invention is to provide an improved partition wiring system including a wiring harness assembly disposed within an electrical raceway and having a round female post connector at one end underlying a panel supporting post, and a round male post connector at the other end connected to a mating component disposed beneath an adjacent supporting post.

Still another object of the present invention is to provide an improved partition wiring system including individual electrical raceways attached to the bottom of each of a plurality of panels and housing individual electrical harness assemblies having mating components at opposite ends thereof providing for selected angular attachment to similar mating components carried by the electrical raceways of adjacent panels.

Another object of the present invention is to provide an improved partition wiring system including a series of removably connected harness assemblies disposed within a plurality of electrical raceways attached to the bottom of partition panels, with selected connectors among the harness assemblies including outlet wires leading into the interior of adjacent square support posts to supply current to electrical outlets carried by the posts.

An additional object of the present invention is to provide an improved partition wiring system including electrical raceways attached to the bottom of each of a plurality of panels and containing individual wiring harnesses supplying current to the interior of selected posts between the panels with separate telephone raceways removably attached to the bottom of each of the electrical raceways.

A further object of the present invention is to provide an improved partition wiring system including panel attached to round posts allowing of variable angular disposition therebetween with removably connected harness assemblies disposed within a plurality of electrical raceways attached to the panel bottoms and supplying current to electrical outlets carried by the electrical raceways.

With these and other objects in view which will more readily appear as the nature of the invention is better understood, the invention consists in the novel construction, combination and arrangement of parts hereinafter more fully described, illustrated and claimed.

FIG. 2 is an inverted exploded perspective view of the bottom of a portion of a partition wiring system according to the present invention with the inclusion of telephone raceways.

FIG. 3 is a transverse, vertical section view illustrating an assembled telephone and electrical raceway attached to the bottom of a partition panel.

Similar reference character designate corresponding parts throughout the several figures of the drawings.

Figure 1:
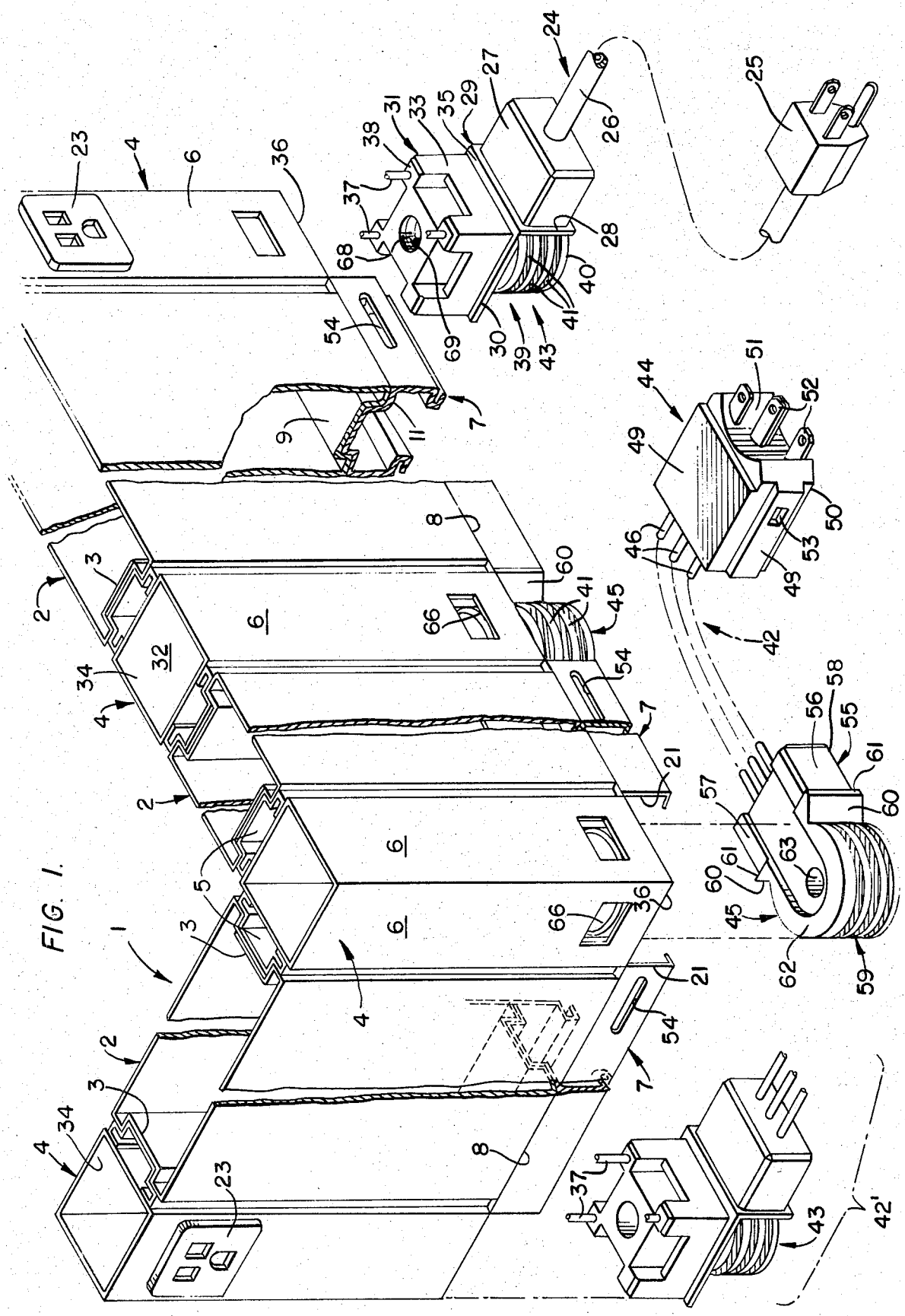
FIG. 1 is a fragmentary top perspective view of a partition wiring system according to the present invention with certain of the components disposed in an exploded relationship.
Figure 4:
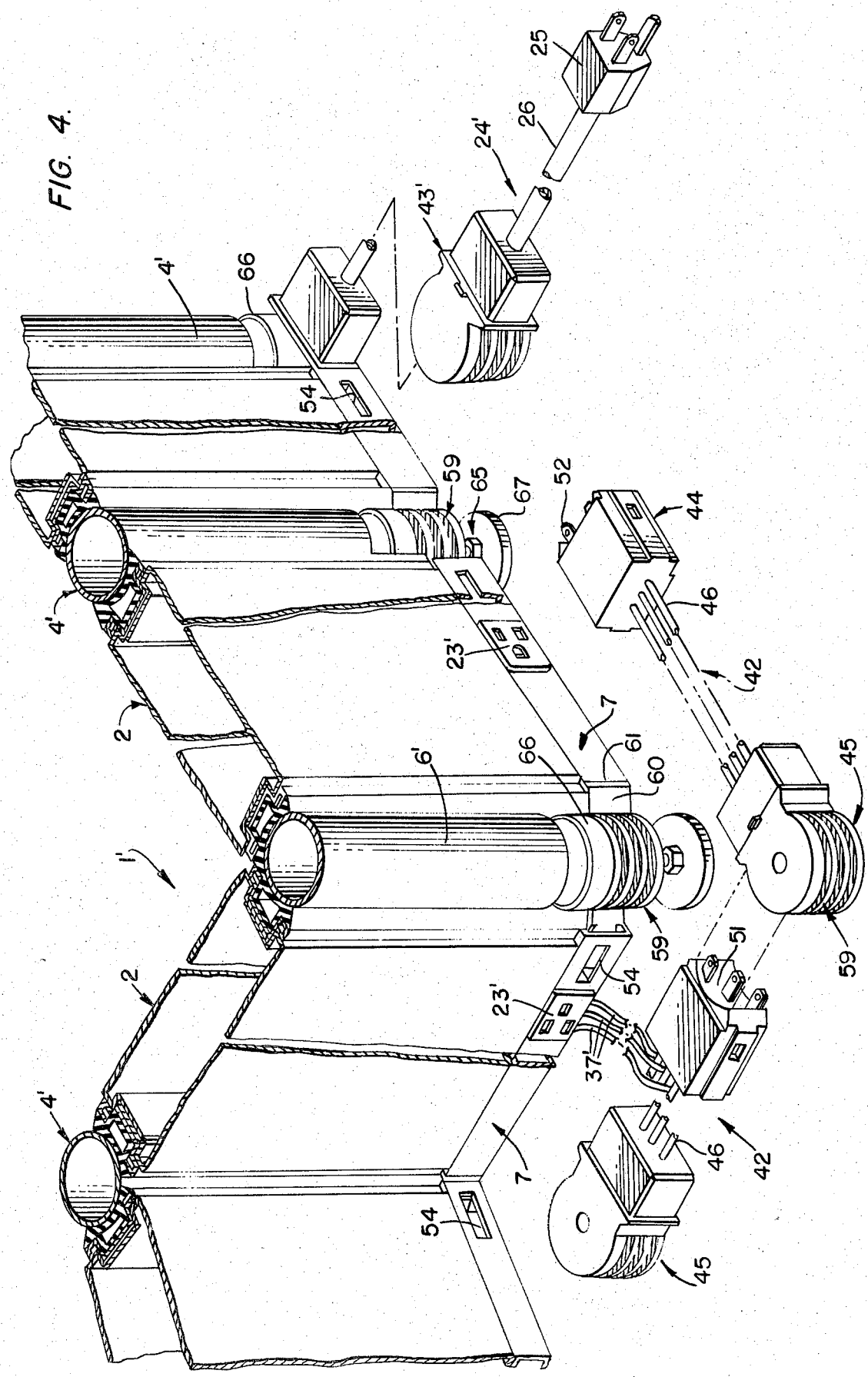
FIG. 4 is a view similar to FIG. 1 and illustrates another embodiment employing round posts supporting the panels.

Referring now to the drawings, particularly to FIG. 1, the present invention will be seen to relate to a partition assembly generally designated 1, comprising a plurality of panels 2 each having a vertical side edge 3 joined to an upright square connecting post or support 4. The specific manner of attachment of the edges 3 of the panels to the adjacent posts 4 is not critical in carrying out the present invention, there being numerous well known means available in the art. A typical connection is provided by means of the edge channel members 5 carried by the panel edges 3 and adapted to be removably attached to any wall 6 of the square posts 4 by suitable means (not shown). In the embodiment of FIG. 4 the same attachment is achieved with the round post 4' having the cylindrical peripheral wall 6' in the partition assembly 1'.

The wiring system of the present invention includes a separate electrical raceway, generally designated 7, adapted to be attached to the bottom 8 of each of the panels 2. As shown most clearly in FIGS. 2 and 3 of the drawings, the panel bottom 8 is preferably constructed to provide an intermediate bottom channel member 9 which is adapted to receive the medial top channel 10 formed in the top wall 11 of the electrical raceway 7. In this manner, a close mating fit is provided between the channel member 9 and top channel 10 to transversely orient the raceway when affixed to the panel bottom 8. The subsequent rigid attachment thereto is readily effected by the application of suitable fasteners 12 through the slots 13 in the raceway top channel 10. Each raceway further includes a pair of spaced apart side walls 14—14 preferably co-planar with the outer surfaces 15—15 of the panel 2, which side walls terminate in the inturned bottom flanges 16, bottom edges 17 and the outwardly directed lips 18. As will be seen most clearly in FIG. 3 of the drawings, the lips 18 terminate short of the vertical plane of the raceway side walls 14 and are spaced downwardly from the bottom flanges 16 to provide respective grooves 19 for reasons which will become obvious hereinafter.

A further point which may be noted at this time is the fore-shortening of the longitudinal structure providing the grooves 19—19 at each end of the raceway 7. From the inverted view of FIG. 2 it will be seen that the end 20 of the raceway bottom edge and lip is well spaced from the end edge 21 of the raceway side walls 14 with a plurality of cut-outs 22 being formed in the remaining inturned bottom flanges 16 adjacent the ends of the raceway. The overall length of each electrical raceway 7 is selected such that the two end edges 21 thereof will extend up to the juxtaposed walls 6 of the two adjacent support posts 4.

Since the purpose of the present invention is to provide for the supply of electric current to any one or all of the square posts 4 or any one or all of the raceways 7 from a single electrical supply line feeding the partition assembly, the disposition of the various components of the present invention will be governed by the desired location of the various post electrical outlets 23 or 23'. As shown in FIG. 1 of the drawings, electrical current is brought to the partition assembly 1 by means of a starter unit 24 associated with the right-hand end post 4. This unit includes a three-prong plug 25 joined to a supply cord 26 leading to a circuit supply connection unit 27. The supply connection unit is mounted upon the side element 28 of a support plate 29 having a top element 30 which in turn serves to retain an elevated post mounting section 31 insertable within the interior 32 of the square post 4. The mounting section 31 includes four planar lateral walls 33 providing a close press fit against the inner surfaces 34 of the post walls 6 and it will be seen from the drawings that the support plate top element 30 extends outwardly beyond the periphery of all four of the lateral walls 33 a short distance to provide a peripheral shoulder 35 adapted to abut the post bottom edge 36.

Positive, negative and ground outlet wires 37 project upwardly from the top 38 of the mounting section 31 and are suitably attached to the electrical outlet 23 disposed within the right hand supporting post 4. The three wires 37 lead downwardly through the mounting section 31 into a substantially cylindrical head 39 attached beneath the top element 30 of the support plate 29. The cylindrical head 39 includes an outer periphery 40, the diameter of which corresponds to the width of any one of the walls 6 of the square post 4 and includes a plurality of stacked dielectric sections with three horizontal intermediate peripheral electrical contact grooves 41 therebetween. Each of these grooves 41 is provided with suitable well known conductive means such as copper leaves which in turn are joined to the respective ones of the three wires 37 such that upon the subsequent insertion of a conductive element into any one of the grooves 41, an electrical circuit will be completed. It will be obvious that the conductive components associated with the grooves 41 are in turn suitably attached to respective wires of the three wires contained within the supply cord 26.

Up to this point adequate structure has been described to provide electrical current to the single right hand post 4. In order to distribute this electrical current to any or all of the remaining posts 4 in any one partition assembly 1, a plurality of harness assemblies, such as the assembly 42, are positioned within each of the electrical raceways 7 and are connected in turn to the cylindrical head 39 of the square female post connector generally designated 43. The details of the harness assembly 42 are shown most clearly in FIG. 2 of the drawings wherein it will be seen that each assembly comprises two primary components, namely a round male post connector 44 at one end and a round female post connector 45 at the other end.

Three separate harness wires 46 join the two connectors 44 and 45 and are of a length sufficient to permit the sequential insertion of the two connectors into the raceway interior 47 from the respective end edges 21 thereof. The male post connector 44 is inserted into the end edge 21 of the raceway 7 intended to be juxtaposed the square female post connector 43 and includes side walls 48 of a vertical extent selected to provide a close sliding fit between the opposed top walls 11 and inturned bottom flanges 16 of the raceway when the top surface 49 and bottom surface 50 are inserted into the interior 47 of the raceway. The outer end of the connector 44 will be seen to include a curved end wall 51, the radius of curvature of which substantially corresponds to the radius of curvature of the cylindrical head outer periphery 40 of the square female post connector 43. Projecting from this end wall 51 are three prongs 52 which will be seen to be both vertically and laterally staggered with the vertical offset distance corresponding to the vertical spacing of the three peripheral electrical contact grooves 41 of the square female post connector 43. With the foregoing structure in mind it will follow that merely by displacing the male post connector 44 relative the longitudinal axis of the raceway 7, the prongs 52 may be either inserted or removed from engagement with the electrical contact grooves 41 and this displacement is facilitated by means of the provision of a recess 53 in one of the male post connector side walls 48, which recess is longitudinally aligned with an enlarged slot 54 in one of the raceway side walls 14 adjacent each end of the raceway. Thus, by inserting an appropriate tool such as a screwdriver blade through the raceway slot 54 and into the male post connector recess 53 it will follow that the connector 44 may be easily axially displaced within the raceway to either engage or disengage the prongs 52 from the cylindrical head grooves 41.

Inasmuch as the exterior configuration of the male post connector 44 is substantially symmetrical it will be understood that it is advantageous to provide means to preclude improper alignment of the respective prongs 52 relative the cylindrical heads 41 and this is achieved by providing an access slot 54 on only one raceway side wall at each end thereof while the male post connector recess 53 is provided on only one side wall 48 thereof. In this manner polarity will be maintained regardless of which end of any one raceway the male post connector 44 is disposed.

The ends of the three harness wires 46 entering the male post connector 44 are obviously respectively electrically connected to the appropriate prongs 52 and the opposite ends of the wires 46 are disposed within an insert section 55 of the round female post connection 45. This insert section 55 includes vertical side walls 56, a top surface 57 and a bottom surface 58 configured to provide a close sliding fit within the interior 47 of the raceway 7. This insert section 55 is joined to a cylindrical head 59 by means of lateral connecting walls 60 each forming a shoulder 61 adjacent the side walls 56 of the insert section, which shoulders abut the end edges 21 of the raceway and serve to properly indicate when the round female post connector 45 is fully inserted therein. The cylindrical head 59 of the round female post connector 45 is similar in construction to the cylindrical head 39 of the square female post connector 43 and includes a top wall 62 adapted to abut the bottom edge 36 of a square supporting post 4 since its diameter equals the width of each of the four outer walls 6 of the post.

Centrally disposed through the cylindrical head 59 is a smooth bore 63 providing a close sliding fit for the screw shaft 64 of a glide, generally designated 65. Glides as shown in FIG. 2 of the drawings function to support the partition assembly 1 and are usually associated with each one of the supporting posts 4. In the case of supporting posts containing a round female post connector 45, the screw shaft 64 of the glide passes through the bore 63 and fixedly engages means associated within the interior 32 of the post. Any suitable well known glide attachment means may be utilized such as the glide mounting cup 66 which is permanently fixed within the bottom of the post interior 32 and includes either a central threaded bore (not shown) or a smooth bore with an attached weld nut so that by rotating the glide screw shaft 64 the elevation of the glide foot or base 67 may be altered to either vary the overall height of the partition assembly or to adjust for any unevenness in the supporting surface therebeneath.

In the instance of a square female post connector 43, a central bore 68 extends through the post mounting section 31 and cylindrical head 39 and may include a threaded section 69 at the upper-most portion thereof for engagement and retention of glide screw shaft 64. It will be understood that when utilizing the square female post connector 43 with a post 4 the connector itself provides sufficient rigidity to support the glide 65 since the elevated post mounting section 31 provides a close press fit within the post interior 32 and the post is adequately supported upon the connector support plate shoulder 35.

Since it is intended, in the first described embodiment to provide electrical current to the outlet 23 located in the left hand post 4 of FIG. 1, it will follow that a square female post connector 43 must be associated with the bottom 36 of this post. Accordingly, a harness assembly 42' is selected comprising a square female post connector 43 at one end and a round male post connector 44 at its other end with the male post connector 44 being connected to the round female post connector 45 located beneath the adjacent intermediate post 4.

From the above description of the present invention it will be seen that by selecting and interconnecting either one of the harness assemblies 42 or 42' in a series manner, it is possible to readily provide for the introduction of the three outlet wires 37 into the interior 32 of any one or all of the vertical support posts 4 in a partition assembly 1 so as to provide current to any number of electrical outlets 23 associated with any of the posts.

The foregoing disposition is obtainable without the necessity of any modification of the harness assemblies 42 or 42' regardless of whether or not the partition assembly comprises a straight longitudinally extending series of panels and posts or alternatively, a plurality of left hand and right hand, angularly disposed panels with intermediate posts. This flexibility is due to the universal angular mating feature between the described mating components, namely the male post connector prongs 52 and the juxtaposed grooves 41 of the cylindrical heads 39 or 59.

In the embodiment illustrated in FIG. 4 of the drawings, the same harness assembly 42 is utilized beneath the intermediate panels 2 as in the previously described modification. The principal advantage of a partition assembly 1' comprising the round support posts 4' is the adjustability feature allowing of the selective, variable angular disposition between any two adjacent panels 2 and the intermediate round post 4', an angular relationship which is limited in the first described embodiment to only 180° or 90°, in view of the square posts.

With the round support posts it will be seen that no special type of mounting section on the female current supply connector is required for the starter unit 24'. Likewise no different form of connector is required for the distal female connector at the terminus of the electrical system. As shown in FIG. 4, the configuration of the female current supply post connector 43' is similar to that of all of the round female post connectors 45 forming a part of the harness assemblies 42.

In this embodiment the electrical outlets 23' are mounted in the side walls 14 of the electrical raceway 7, at any point or points therein sufficiently spaced from the raceway slots 54 to allow for the axial displacement of the male post connectors 44. Current may be delivered to each raceway outlet 23' by means of outlet wires 37' from each outlet 23' suitably spliced or otherwise electrically communicating with the three harness wires 46 of the respective harness assembly 42.

As previously described, the structure forming the grooves 19 along the bottom of the electrical raceways 7 terminates at end portions 20 well short of the end edges 21 of each raceway, as shown most clearly in FIG. 2 of the drawings. By the removal of some of the structural material at the end portions of the raceways and the provision of the cut-outs 22 in the remaining inturned bottom flanges 16 it will follow that an increased resilience will exist in the remaining bottom flanges 16. This insures a snug yet yieldable sliding fit enhancing the insertion and retention of the respective connectors in the ends of the raceways.

If the user of the partition assembly 1 or 1' of the present invention desires only to provide for the electrical current supply to one or more of the outlets 23 or 23', then the bottom of the individual raceways 7 can be readily enclosed by means of a removable cover 70 comprising a bottom wall 71 and a pair of inturned tongues 72—72. These tongues 72 are configured to provide close sliding fit with the grooves 19 associated with each side of the raceways 7 and are easily slipped over either open end of the raceway to fully enclose the interior 47 thereof. On the other hand, if it is desired to additionally incorporate telephone wiring 73 with the electrical wiring of the partition assemblies, a separate telephone raceway 74 is provided for cooperation with each of the electrical raceways 7 as shown in FIGS. 2 and 3 of the drawings.

The telephone raceways 74 each preferably comprise a unitary component constructed of dual-durometer plastic composition with a rigid plastic material forming a top wall 75 having inturned tongues 76 engageable within the electrical raceway grooves 19 to provide for attachment of the telephone raceway 74 to the electrical raceway in the same manner as the attachment of the electrical raceway cover 70. The telephone raceway includes a medial web 77 defining two separate internal compartments 78—78 bounded at the bottom by the lower wall 79 and enclosed at the outer sides by means of the pairs of side wall sections 80—80. These side wall sections 80 are preferably of a softer, yieldable plastic composition and may be extrude simultaneously with the harder composition of the balance of the raceway and when formed, include the longitudinal wire access slot 81 therebetween. With the foregoing arrangement it will be seen that the telephone wiring 73 may be disposed within either of the compartments 78 within the telephone raceway 74 and withdrawn therefrom at any point throughout the running length of the raceway merely by pulling the wiring through the slot 81 which causes a deflection of the more flexible side sections 80—80 and allows the installation of telephone equipment at any point along the running length of the partition assembly 1 or 1'.

Each telephone raceway 74 is preferably as long as the running length of one of the panels 2 plus the width of one of the square posts 4 or the equal diameter of one of the round posts 4'. This dimensioning of the telephone raceways permits the assembly thereof as shown in FIG. 2 of the drawings wherein it will be seen that one end of each telephone raceway extends beyond the edge 3 of the panel to underlie the adjacent support post 4 or 4' and the connector unit associated therewith, while the next adjacent telephone raceway abuts the side wall section of the first telephone raceway. To accomplish the foregoing, each end of each telephone raceway is cut out to provide the guide slots 82 therein to allow for clearance of the screw shaft 64 of the glide 65 associated with the respective support post. When the round post assembly 1' is provided with telephone raceways 74 and the angular disposition between any adjacent two posts 4' is other than 90° or 180° then quite obviously one or more of the raceways 74 must either be shortened or modified at its ends to accommodate the obtuse angle between the adjacent telephone raceway ends.

We claim:

1. A partition assembly including a wiring system, said assembly including, a panel having a bottom and two lateral edges, a post attached to each said lateral edge, an electrical raceway having an interior mounted beneath said panel bottom, a harness assembly disposed within said electrical raceway, said harness assembly including a male connector and a female connector joined by a plurality of harness wires, means slidably mounting at least a portion of said two connectors within said electrical raceway interior at the respective ends thereof, said female connector including a head disposed beneath one of said posts having peripheral female electrical contact means therein, the other of said posts having an additional female connector thereunder, said additional female connector provided with a head having peripheral female electrical contact means therein, said male connector having a plurality of male electrical contact means projecting from one end thereof removably insertable within the adjacent said female electrical contact means of said additional female connector, at least one electrical outlet mounted on said partition assembly, outlet wires electrically joining each said outlet with said harness assembly, and an electrical supply line joined to said additional female connector and its electrical contact means whereby current delivered by said supply line to said additional female connector is transmitted by said harness assembly to provide current to all said connectors and outlets.

2. A partition assembly according to claim 1 including, a plurality of said panels each having respective said lateral edges each attached to said one of said posts in a series manner, a separate one of said electrical raceways mounted beneath each said panel bottom, one said harness assembly disposed within each said electrical raceway, and said harness assemblies joined to one another with said male connector male contact means mating with the adjacent said female connector female contact means to provide current transmission from said additional female connector to all said female connectors.

3. A partition assembly according to claim 1 wherein, said posts include a cylindrical outer wall defining a round configuration.

4. A partition assembly wiring system according to claim 3 wherein, said electrical outlet is disposed within said electrical raceway.

5. A partition assembly according to claim 1 wherein, said posts include planar outer walls defining a square configuration.

6. A partition assembly according to claim 5 wherein, said electrical outlet is disposed within one of said post walls.

7. A partition assembly according to claim 1 wherein, said posts are hollow, at least one said female connector having an elevated mounting section atop said head, said mounting section having a lateral configuration providing a close sliding fit within the interior of said respective hollow post whereby, when said mounting section is disposed within said post interior said respective head is co-planar with said adjacent harness assembly male connector.

8. A partition assembly according to claim 1 wherein, the length of said electrical raceway extends between the opposed peripheries of said two posts.

9. A partition assembly according to claim 1 wherein, said female connector heads include a substantially cylindrical periphery allowing of selective angular insertion of said male contact means.

10. A partition assembly according to claim 9 wherein, said female contact means includes vertically stacked horizontal grooves in said heads and said male connector having a curved end wall juxtaposed said female head.

11. A partition assembly according to claim 1 wherein, said female contact means includes horizontal grooves and said male contact means includes mating vertically staggered prongs.

12. A partition assembly according to claim 1 wherein, said slidable mounting means on at least one said female connector includes an insert section adjacent said head, a laterally offset shoulder intermediate said insert section and head restricting the disposition of said female connector within said electrical raceway and retaining said head beneath its respective said post.

13. A partition assembly according to claim 1 wherein, said electrical raceway includes side walls having bottom grooves, and a raceway cover provided with a pair of tongues slidable within said raceway grooves.

14. A partition assembly according to claim 1 wherein, said electrical raceway includes side walls having bottom grooves and, a telephone raceway having top tongues slidable within said electrical raceway grooves.

15. A partition assembly according to claim 1 wherein, said female connector heads include a vertical axial bore therethrough, a glide having a foot joined to a screw shaft disposed through each said bore to support said partition assembly.

16. A partition assembly according to claim 1 wherein, said electrical raceway includes a pair of side walls each having a slot adjacent one end thereof, a recess in said male connector alignable with said slot for receiving a tool therethrough to effect longitudinal displacement of said male connector and its male contact means relative said adjacent female connector.

* * * * *